United States Patent [19]

Schade et al.

[11] 4,026,423

[45] May 31, 1977

[54] APPARATUS FOR EXTRACTING BULK MATERIAL FROM DUMPS

[75] Inventors: Fritz Schade, Dortmund; Günter Strocker, Holzwickede KreisUnna; Gerhard Fischer, Dortmund-Kirchhorde, all of Germany

[73] Assignee: Gustav Schade Maschinenfabrik, Dortmund, Germany

[22] Filed: Sept. 24, 1975

[21] Appl. No.: 616,292

[30] Foreign Application Priority Data

Sept. 28, 1974 Germany ............................ 2446514

[52] U.S. Cl. ................................. 214/10; 198/508; 198/519
[51] Int. Cl.² ......................................... B65G 65/28
[58] Field of Search ........ 214/10; 37/191 R, 191 A, 37/192 R, 192 A; 198/508, 519

[56] References Cited

UNITED STATES PATENTS

| | | | |
|---|---|---|---|
| 3,334,759 | 8/1967 | Ludwig | 214/10 |
| 3,557,934 | 1/1971 | Schade | 214/10 X |
| 3,604,572 | 9/1971 | Strocuer et al. | 214/10 |
| 3,658,169 | 4/1972 | Potthoff | 214/10 X |
| 3,814,268 | 6/1974 | Fischer et al. | 214/10 |

FOREIGN PATENTS OR APPLICATIONS

| | | | |
|---|---|---|---|
| 1,325,851 | 3/1963 | France | 214/10 |
| 1,341,715 | 12/1973 | United Kingdom | 214/10 |

*Primary Examiner*—Frank E. Werner
*Attorney, Agent, or Firm*—Meyer, Tilberry & Body

[57] ABSTRACT

An improved bulk extracting apparatus comprises a pivoted chain scraper conveyor which in the horizontal position acts to remove material from the transverse face of a dump. Various clearing means are provided to loosen material from the face of the dump which is then carried by gravity to feed the scraper conveyor. Alternatively, the scraper conveyor may be pivoted upwardly to clear the dump so that the apparatus may be easily moved either to a different dump or to a different position on the same dump. The scraper conveyor may also be partially lowered to act to remove material from a lateral side of the dump. Finally, stacking means may be additionally provided for adding material onto the dump such as for mixing purposes.

22 Claims, 13 Drawing Figures

APPARATUS FOR EXTRACTING BULK MATERIAL FROM DUMPS

The invention relates to apparatus for extracting bulk material from dumps, and particularly to apparatus to run along the dump and having clearing means acting on a transverse face of the dump, together with a transverse conveyor constructed as a scraper chain for carrying away the bulk material cleared from the transverse face of the dump, in the region of the bottom of the latter.

Extraction apparatus operating on the transverse face of the dump are known in various forms of construction. Such extraction apparatus comprise, for example, a bucket wheel adapted to be reciprocated on a travelling bridge support transversely in relation to the axis of the dump, or a rotating bucket tube extending substantially over the whole width of the dump and picking up the bulk material in the region of the bottom of the latter and conveying it towards the side thereof. Other known extraction apparatus operating on the face of the dump comprise, instead of a driven bucket wheel or a bucket tube, a scraper chain mounted on the travelling bridge support.

In known bridge apparatus of the aforesaid kind, there are employed clearing devices of various constructions, such as, for example, reciprocating harrows, swivellable stripper ropes and the like. The clearing devices dislodge the bulk material on the slope of the transverse face of the dump, so that it trickles down into the working region of the bucket wheel, the bucket tube or the scraper chain, where it can be taken up and carried away.

Such known bridge apparatus which act on the transverse face of the dump distinguished by good mixing properties. They are therefore employed with advantage especially when good mixing or homogenisation of the bulk material removed from the dump is required. On the other hand, bridge apparatus equipped with bucket wheels or bucket tubes constitute machinery which is of complicated construction and heavy. In addition, a substantial disadvantage of all such known bridge apparatus is that, they have low mobility, and can generally only serve, working on a transverse face one dump or, if the apparatus can work in both directions of travel, at most two dumps situated one behind the other. When bulk material is dumped in piles disposed side by side or one behind the other in a chain, it is impossible to transfer the bridge apparatus from one dump to any other, at least without costly machine-shifting devices. Also, such bridge apparatus cannot be used at any desired point of a longitudinal dump.

Extraction apparatus are also known which are provided with a gantry which spans the dump and is adapted to travel along the latter and which comprises one or more vertically rockable scraping arms which carry away the bulk material from a lateral slope of the dump parallel to the directions of travel. Such equipment is of high-performance extremely mobile and therefore versatile, and longitudinal or ring-shaped dumps or chains of dumps can be cleared at any desired points. Different types of bulk material can thus be extracted with any desired alternation between various piles of bulk material. However, such equipment is generally not so suitable for mixing purposes, for example for bringing ore, raw coal, cement raw material and the like into a uniform state.

According to the present invention there is provided apparatus for extracting bulk material from a dump constructed and adapted to run along the dump in a given direction, having clearing means which in a working position are for dislodging material from a face of the dump which is transverse to the said direction upon movement of the apparatus along the dump to advance the clearing means into the face and a conveyor in the form of a scraper chain with a working position transverse to the said direction and which is operable to remove transversely material, dislodged by the clearing means, from the bottom of that face, both the clearing means and the scraper chain conveyor each being movable out of the said working positions.

The apparatus can clear the dump by removal of material from a transverse face, in the same way as the known bridge apparatus, this being done with the clearing means operating on the transverse face slope and the transverse scraper chain conveyor. The clearing means moves over a range of working positions, to dislodge material from a transverse face in the course of such movement. The clearing means and the scraper chain conveyor are moveable out of the said working positions to nonworking positions in which they are held clear of the cross section of the dump, to allow the apparatus to be moved along, and off, the dump. Thus the apparatus can be run without hindrance along one dump and brought to another place of use. It is therefore possible, with one and the same extraction apparatus, to work on longitudinal dumps or dump portions situated one behind the other in the direction of travel of the machine and hence to extract different types of bulk material according to requirements.

The transverse conveyor is preferably pivotally mounted so as to be swivellable in the vertical plane, so that it can be swivelled upwards out of its working position close to the bottom of the dump and to a position clear of the cross-section of the latter when the apparatus is to be run along the dump. The swivellable transverse conveyor may be similar to the scraping arm known per se, so that it can be placed in a second working position whereby material can be removed from the lateral slope of the dump if desired. The clearing means is used only for working on a transverse face slope of the dump and during work on a lateral face is moved to its non-working position in which it does not interfere with the travel of the extraction apparatus past the dump. Consequently, with an extraction apparatus constructed in this form, two modes of operative are possible. It is possible to clear dumps of bulk material by taking material from either their lateral slopes or their transverse faces. It is then also possible, using the pivotally mounted scraping arm to cut into the pile of bulk material at any point, to creat an aisle from which the dump can then be cleared by removal from one of the transverse faces thus created.

Accordingly, in a preferred construction of the extraction apparatus there is a gantry constructed and adapted to span the dump and run along it in the said direction, and the transverse scrapper chain conveyor includes an arm pivotally mounted to the gantry for movement in a vertical plane transverse to the said direction of travel so that the conveyor is operable in a second working position for acting on a lateral slope of the dump generally parallel to the said direction. In this case, the clearing device which in its working position acts on the transverse face of the dump is also disposed on the gantry or the transverse conveyor. Such an extraction apparatus is distinguished by good mobility and versatility in use. It may be employed at any point of a longitudinal dump or a chain of longitudinal dumps, and it can be constructed at relatively low cost and can operate with high performance.

The ends of the transverse scraper chain conveyor are preferably carried a rigid arm extending therebetween the length of the conveyor being at least substantially equal to the transverse width of the dump at its foot. It is desirable for the arrangement to be such that the scraping arm, in the region of its free and remote from the pivotal mounting to the gantry, bears laterally against the gantry in a manner known per se. In this way, the arm and its pivotal mounting are substantially relieved of the bending forces set up in operation. The arrangement may with advantage be such that the arm bears laterally against the gantry over its whole swivelling range under the horizontal forces which become effective during operation. On the other hand, a construction is possible in which the free end of the arm bears against the gantry only in the lowered first said working position in which it is employed, (in combination with the clearing means working at the transverse face,) as a transverse conveyor i.e. as a bridge scraper. In this case, there is provided on that side of the gantry which is situated remote from the pivotal mounting of the arm support means which laterally supports the arm only in the lowered operating position.

It is possible to provide a plurality of transverse scraper chains conveyors with arms pivotally mounted on the gantry and substantially in parallel juxtaposition and/or one behind the other in the longitudinal direction on the gantry. For example, there may be pivotally connected to each of the two feet of the gantry a conveyor which is adapted to be raised and lowered, the sum of the lengths of these conveyors being at least substantially equal to the width of the dump at its foot. When the apparatus is acting on the transverse face of the dump, the two conveyors together form a transverse conveyor which extends substantially over the whole width of the dump and by means of which the bulk material dislodged from the face slope of the dump by the clearing means is carried away. It is also possible to provide a conveyor whose arm is in two hingedly connected parts, in the manner already known in the case of extraction scrapers of the gantry type. In principle, the known constructional features of gantry-type apparatus, in regard to the arrangement, construction and mounting of the scrapers chain conveyors may be applied to the extraction apparatus of this invention.

For the clearing means operating on the face of the dump, there may also be employed apparatus of various types structurally combined with the extraction apparatus. If the apparatus includes a gantry, the clearing means may be mounted thereon. The clearing means is preferably reciprocable over the transverse face of the dump by means of a reciprocating drive, by means of which it can also be moved to a non-working position clear of the cross-section of the dump. The clearing means in this case desirably consists of a flexible clearing element such as a chain or a rope, which can be reciprocated to and fro in a guided clearing movement over a transverse face of the dump by means of the reciprocating drive, means being provided for accomodating the variation in the length moving over the transverse face of the dump during reciprocation. A suitable construction for this purpose, has swivelling points for the flexible clearing element adjacent the feet of the two opposite sides of the gantry so as to be in the neightbourhood of the bottom of the dump, the reciprocating drive engaging the flexible clearing element between the two said swivelling points, at least one of which being a direction changing member for the flexible clearing element, and over which extra length is brought in from a reserve or surplus length returned thereto to keep the flexible clearing element taut.

It is also desirable that the apparatus has an arm for supporting the clearing means extending from the gantry in the said direction of travel and above the apex of the dump. It is readily possible to provide clearing means at either side of the apparatus, in the said direction of travel, forming double clearing means operable either forwardly or in reverse with respect to the said direction of travel. Clearing devices of the aforesaid kind, comprising a swivellable clearing rope which may be employed with advantage in the extraction apparatus according to the invention, are disclosed in German Offenlegungsschriften Nos. 2,308,713 and 2,245,086, and in German Utility Model No. 6,929,752.

In accordance with a further feature of the invention, the clearing means may consist of at least one rod-form or beam-form clearing element, one end of which is preferably pivotally mounted on the apparatus adjacent the base of the dump, while it is slidingly supported at a distance from the pivotal mounting in a member which in turn is constructed and adapted to be raised and lowered on an inclined guide by means of the reciprocating drive. The said slideway member preferably consists of a sleeve which is rotatably mounted on a saddle or carriage which is upwardly and downwardly movable on the inclined guide. Preferably the guide extends substantially at the angle of the face of the dump. In order to increase the clearing action, more particularly in the case of caking bulk material, the clearing means may be provided with teeth or with driven cutting means such as, for example, a worm or a cutting chain.

The extraction apparatus according to the invention may also have stacking means for dumping further bulk material onto the dump. The said stacking means is preferably disposed on the apparatus outside the raking regions of the clearing means and advantageously includes a stacking belt disposed on an arm pivotally mounted on the gantry, substantially in the vertical plane. In this way, there is provided an extraction apparatus which acts on the transverse face of the dump and which at the same time can create a separate dump (mixing bed). This is possible for the first time because, in the apparatus according to the invention, the transverse face slope-clearing means and the transverse scraper chain conveyor can be swung clear of the cross-section of the dump.

Embodiments of the invention will be described by way of example with reference to the accompanying diagrammatic drawings, in which.

Figure 3:
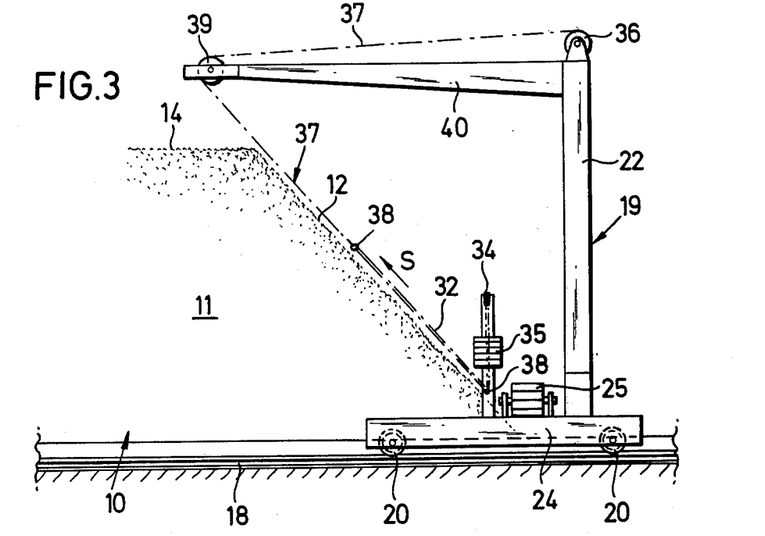
FIG. 3 shows the extraction apparatus of FIGS. 1 and 2 in side elevation.
Figure 4:
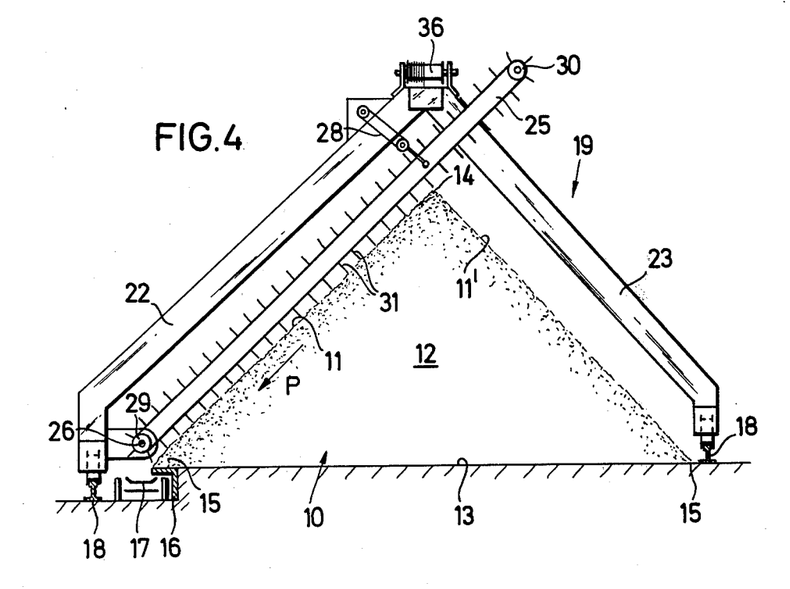
FIG. 4 shows in elevation (transverse to a dump) the manner of operation of the extraction apparatus of FIGS. 1 and 3 as a gantry scraper engaging the lateral slope of the dump.
Figure 11:
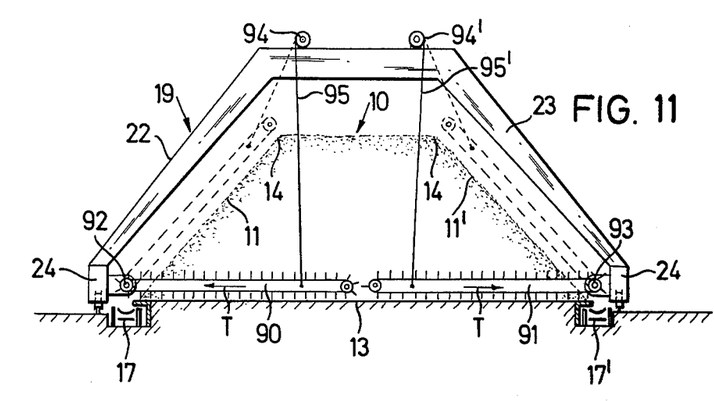
FIG. 11 is an elevational view (transverse to a dump) of an extraction apparatus with two pivotally mounted scraping arms.

Referring to the drawings, the illustrated extraction apparatus serve for the removal of material from bulk-material dumps 10, which may for example have a triangular cross-section as illustrated in FIGS. 3 and 4, or a trapezoidal cross-section as illustrated in FIG. 11. There are denoted by 11 and 11' the two lateral slopes and by 12 the transverse face (which may be an end face) of the dump 10. The bottom of the dump, i.e. the base on which it rests, is formed by the area 13. The apices of the triangular and trapezoidal dumps are denoted by 14, while the feet i.e. the bottom edges of the dumps bear the reference numeral 15.

Figures 1, 2:
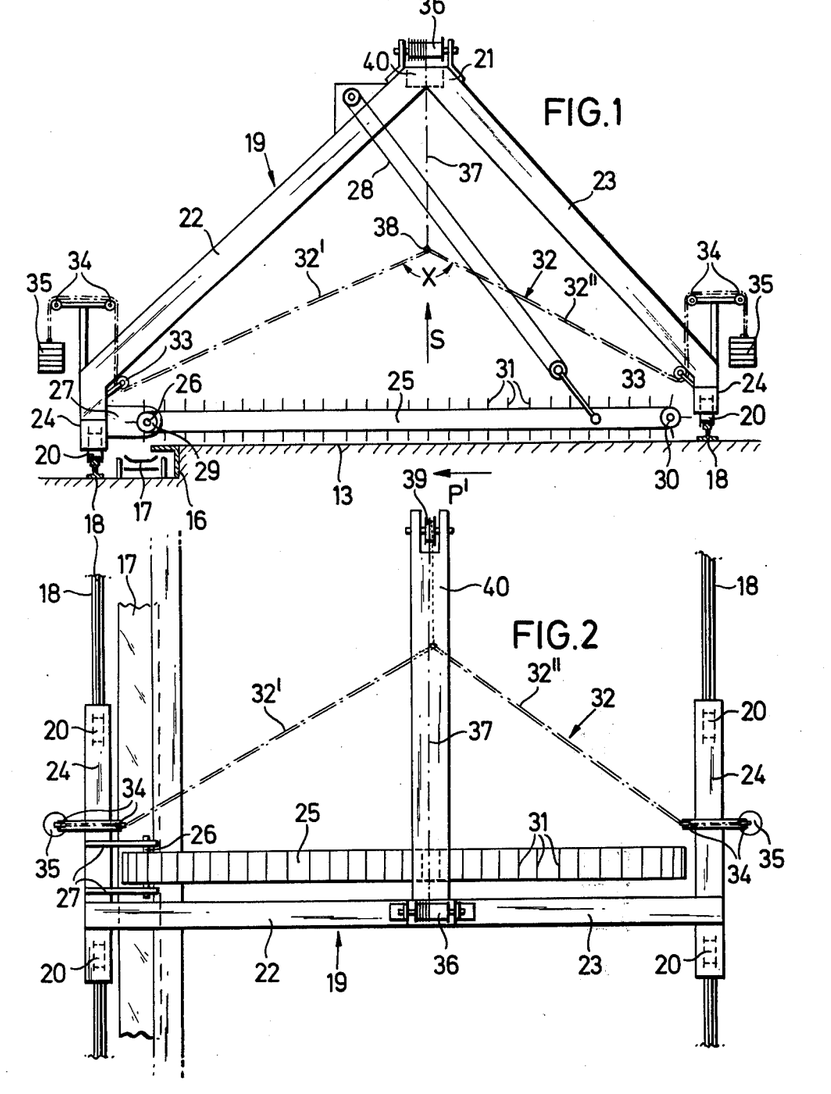
FIG. 1 shows in elevation (transverse to a site for a dump) an extraction apparatus.
FIG. 2 shows the extraction apparatus of FIG. 1 in plan view.

The base 13 of the dump may for example be horizontal as shown in FIG. 1, or it may be inclined in the manner of a ramp which rises slightly towards a lateral dumpbounding wall 16. Extending along the dump 10 laterally of the boundary wall 16 is a fixedly located depot belt 17, through which the bulk material to be removed from the dump is carried out of the storage area.

There are denoted by 18 parallel-extending rails situated in juxtaposition to the two bottom edges 15 of the dump on which rails a gantry 19 spanning the dump 10 is driven by means of driven running wheels 20. The gantry 19 can thus be run along the dump 10 in both directions.

As is shown in FIGS. 1 to 4, the gantry 19 consists of two inclined legs 22 and 23 which are connected at the apex 21 of the gantry above the dump and which each bear on a head beam 24. The runners 20 and the drive for the extraction apparatus are mounted on the head beam 24.

The extraction apparatus shown in FIGS. 1 and 4 has a scraping arm 25 which serves inter alia as a transverse conveyor and which includes an arm pivotally mounted in a pivot bearing 26 situated in the neighbourhood of the bottom 13 of the dump on a bracket 27 on the gantry at the side of the dump. The scraping arm 25 can consequently be raised and lowered in the vertical plane, which may be done in the conventional manner with the aid of a winch, of which the hoisting cable is shown at 28.

The scraping arm 25 may consist in known manner of a girder, for example a box girder of welded construction on the two ends of which there are mounted sprocket wheels 29 and 30, around which two endless parallel scraper chains provided with scrapers 31 are driven.

The scraping arm 25 is suspended intermediately between its ends on the gantry 19 by means of the hoisting cable 28 so that it can be lowered from the lifted position shown in FIG. 4 down to the bottom 13 of the dump (FIG. 1). The length of the scraping arm 25 is substantially equal to the transverse width of the dump between its feet 15. It is apparent that, when the scraping arm 25 is in the lifted position, it extends upwards beyond the gantry 19 (FIG. 4), while in the lowered position according to FIG. 1 it lies over its whole length below the gantry 19 between the head beams 24 of the latter.

The manner of operation of the storage apparatus in one mode of operation, viz as a gantry scraper of conventional type, which removes material from the lateral slope 11 of the dump 10 is apparent from FIG. 4. During the extraction work, the gantry 19 travels along the dump 10. The scraping arm 25 is lowered by means of the hoisting cable 28 sufficiently that it bears on the lateral slope 11 of the dump, where it converys the bulk material down the slope by means of its scrapers 31 as indicated by the arrow P. The bulk material then slides over the top surface of the wall 16 bounding the dump on to the depot belt 17, which conveys it away from the region of the dump. When the extraction apparatus has reached the end of the dump, the scraping arm 25 is further lowered to the extent of the cutting depth of its scrapers 31, whereafter the apparatus is run along the dump in the opposite direction and clears it to the extent of a further cutting depth. This cycle can be repeated until the dump has been completely removed.

In another mode of operation the extraction apparatus shown in FIGS. 1 to 4 can remove material from the transverse face 12 of the dump 10, for example if this is desired for the purpose of improving the mixing effect. For this the scraping arm 25 is lowered onto the bottom 13 of the dump, and operates as a transverse conveyor in the form of a scraper chain. The extraction apparatus also has separate clearing means (omitted from the illustration of FIG. 4 for the sake of clarity), which dislodges the bulk material on the face 12 of the dump and causes it to trickle down, so that it passes into the conveying range of the scraping arm 25. The scrapers 31 of the scraping arm 25 lowered as illustrated in FIG. 1 take up the bulk material in the region of the bottom of the dump and transport it in the direction of the arrow P' over the bottom 13 of the dump on the depot belt 17, by which it is then conveyed out of the region of the dump.

Again with this manner of operation, the extraction apparatus moves laterally along the dump at a constant speed.

As may be seen from FIGS. 1 to 3, the aforesaid clearing means consists of a flexible clearing element, such as a chain or a clearing rope 32 which passes around a guide member, such a guide roller 33 and around further guide rollers 34, on both sides of the dump 10. The guide rollers 33 and 34 are mounted in the lower region of the dump, adjacent the dump feet 15. They are carried by roller supports fast with the gantry 19. Tension weights 35 on the two ends of the clearing rope 32 maintain the rope constantly in tension. Instead of the tension weights, there may of course be provided other tension devices, such as tension springs, tension cylinders and the like.

There is provided as the drive for the swivelling of the clearing rope 32 a winch 36, which is mounted at the apex 21 of the gantry 19, and the cable 37 of which engages the clearing rope 32 substantially centrally at the point of connection 38. The winch cable 37 is passed over a sheave 39, which is mounted on the free end of an arm 40 extending parallel to the direction of motion of the gantry. The arm 40 is secured to the gantry 19 in the region of its apex and lies above the apex 14 of the dump over its whole length.

As the winch cable 37 is wound on to the drum of the winch 36, the point of connection 38 moves upwards along the face slope 12 substantially in the direction of the arrow S. The two sections 32' and 32'' of the clearing rope 32 which lie between the point of connection 38 and the guide rollers 33 then swivel up the slope about the aforesaid guide members 33, which act as centres. Each section 32' or 32'' increases in length taking in rope from the end portions of the rope (which have a number of changes of direction) against the tension provided by the tension weights 35, thus effecting a length compensation. Conversely, when the winch cable 37 is paid out, the point of connection 38 travels down the slope in the direction opposite to that of the arrow S substantially into the region of the bottom of the dump, the two rope sections 32' and 32'' also carrying out swivelling movements about the swivelling centres 33. In the lower position (FIG. 3) the two rope sections 32' and 32'' are substantially straightened, with respect to each other while when they are moved upwards in the direction of the sheave 39 of the winch cable 37, the angle X between them progressively decreases. Consequently, when the direction of rotation of the winch 36 is changed, the two sections 32' and 32'' of the clearing rope 32 perform a swivelling movement up and down the slope similarly to two oppositely operating windscreen wipers, dislodging the bulk material on the face slope 12 so that it slides down the slope under the action of gravity and is taken up in the bottom region by the scraping arm 25 operating as a transverse conveyor and conveyed to the depot belt 17. The downward movement of the clearing rope 32 on the slope 12 at the same time assists the downward flow of the bulk material towards the bottom 13 of the dump. Consequently, with a continuous, slow advance of the machine the dump 10 is cleared by removal from the transverse face 12.

When the winch cable 37 has been hauled in to such an extent that the point of connection 38 lies above the dump apex 14, the whole clearing device, together with the clearing rope 32, is clear of the cross-section of the dump. The same applies to the scrapng arm 25 when it is raised into the position shown in FIG. 4. In this case, it is readily possible for the whole extraction apparatus to be run without hindrance along and off the fully built-up dump, for example, to another dump situated behind the dump 10 as seen in the direction of travel, material then being cleared from the face of the latter dump in the same way with the aid of the clearing device and the lowered scraping arm. On the other hand, the extraction apparatus can operate conventionally as a gantry scraper in the manner described above. In this case, the clearing device with the clearing rope 32 is lifted clear of the cross-section of the dump and its driving winch stopped. The clearing of the dump then takes place merely by means of the scraping arm 25 acting on the lateral slope 11.

With the pivotally mounted scraping arm 25, an aisle may also be cut into a longitudinal or ring-shaped dump at any point, from which further material can then be removed from the dump with the clearing rope working on the transverse face and using the lowered scraping arm in its lateral position.

Figure 5:
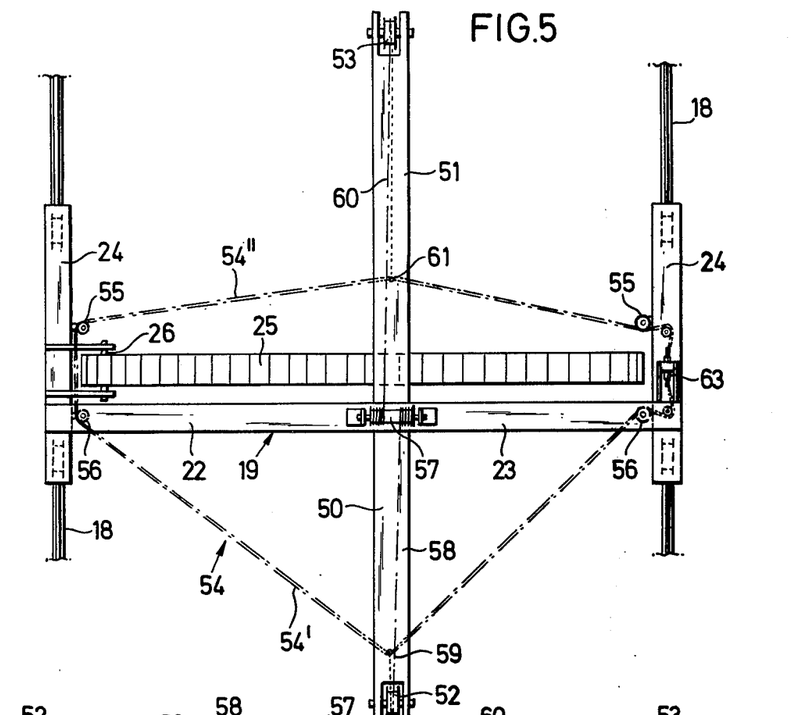
FIGS. 5 and 6 are a plan view and a side elevation respectively of an embodiment of an extraction apparatus with clearing means at both sides.
Figure 6:
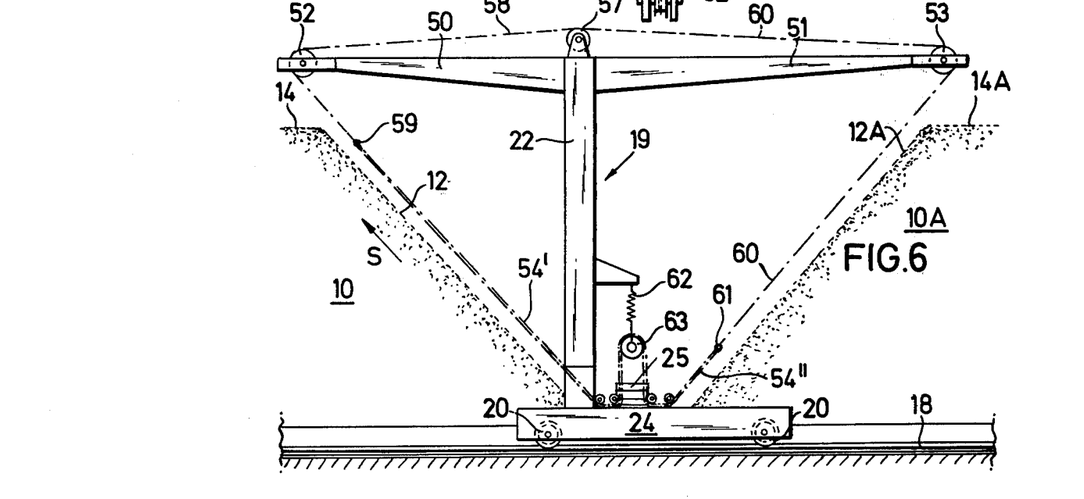

The extraction apparatus shown in FIGS. 5 and 6 corresponds in construction and manner of operation to that described in the foregoing. The only difference resides in the form of the clearing means, which is here so designed that the extraction apparatus can clear a dump from a transverse face either forwardly in one direction of travel or in the reverse direction according to choice. Like parts are denoted by like references.

In FIG. 6, the two dumps situated one behind the other at a distance apart are denoted by 10 and 10A. The dump 10 has the face slope 12 and the dump 10A the face slope 12A. The gantry 19 has in the region of its apex two arms 50 and 51 projecting in opposite directions but parallel to the direction of travel disposed above the apices 14 and 14A of the two dumps and each carrying at their free end a sheave 52, 53.

The clearing means is again swivelling and is a double clearing means formed by an endless chain or an endless clearing rope 54. At either side of the dumps 10 and 10A the clearing rope 54 passes in the neighbourhood of the feet of the gantry, around guide rolles 55 and 56 which are mounted on the gantry 19 or on its head beams 24. The guide rollers here again form centres about which the clearing rope swivels.

Disposed on one or other of the arms 50, 51 or on the apex of the gantry 19 is a double winch 57, of which one cable 58 is passed over the arm 50 and the sheave 52 mounted on the tip of the latter, and is connected at one end at the connecting point 59 to that section 54' of the endless clearing rope 54 which lies on the side of the arm 50. The connecting point 59 thus forms one point which is acted on by the force of the winch 57 serving as the reciprocating drive for the clearing rope 54. The other winch cable 60 is correspondingly passed around the arm 51 and the sheave 53 mounted on the tip thereof and is attached at its end, at the connecting point 61, centrally to the section 54'' of the clearing rope 54. The arrangement is such that, when the endless clearing rope 54 has been lifted to the end positions, one point of action of the force, in the present instance the connecting point 61, lies in the neighbourhood of the bottom 13 of the dump and the other, in the present instance the connecting point 59, lies in the neighbourhood of the dump apex 14, 14A the winch cable 60 having been paid out by the drum and the other winch cable 58 having been wound on to the drum. When the direction of rotation of the double drum is reversed, the connecting point 61 travels up the transverse face slope 12 of the dump 10 in the direction of the arrow S, while the other connecting point 59 travels downwards towards the bottom of the dump. It will be apparent that, by reversal of the direction of rotation of the double drum 57, the section 54'' of the endless clearing rope 54 moves alternately between the straight or only slightly angled form (shown in FIG. 5), situated in the neighbourhood of the bottom of the dump and extending between the swivelling points 55 generally across the whole width of the foot of the dump, and a top position in which it is angled centrally at the point of connection 61 and extends from the connecting point 61 situated in the region of the dump apex 14, towards the guide members 55 at both sides of the bottom of the dump. In FIG. 5, the rear, non-working section 54' (shown at the bottom) of the clearing rope 54 behaves similarly.

Therefore, it is possible with the clearing rope 54 reciprocated by the double drum 57 either to clear the dump 10 or to clear the dump 10A, at the transverse face 12, 12A, according to choice, the clearing rope section 54" performing the clearing work in the first-mentioned case, with the other clearing rope section 54' running idly to provide length compensation while in the other case the clearing rope section 54' performs the clearing work and the clearing rope section 54" carries out an idle movement and at the same time ensures the length compensation of the working section of the clearing rope. A tension device is here again provided in the endless clearing rope 54. This device consists, for example, of a tension spring 62 which engages with a tension roller 63 around which the endless clearing rope 54 passes. The tension device 62, 63 constantly maintains the clearing rope 54 in tension and at the same time forms a bight of rope to act as a rope reserve for the length compensation of the clearing rope.

Double clearing means of the kind described in the foregoing, which are provided with an endless clearing rope reciprocated with a swinging movement, are disclosed in German Offenlegungsschrift No. 2,308,713. In the case of the extraction apparatus shown in FIGS. 5 and 6, the arrangement is again such that the clearing rope can be taken clear of the cross-section of the dump when the apparatus is to be run longitudinally past the dump without operating on a face thereof. In the simplest form of construction by which this can be achieved, the endless clearing rope is broken at some point for example at a point in the section 54" situated to the rear in the direction of travel, so that this section of the rope may if desired be moved clear of the cross-section of the dump by means of an auxiliary device such as a winch, for example, while the other rope section 54' situated at the front as seen in the direction of travel is lifted with the aid of the winch 57 to such an extent that its point of connection 59 lies above the apex 14 of the dump. In this case, two individual winches are required instead of the double winch 57. On the other hand, the endless clearing rope 54 may alternatively be given such a length that the two points of connection 59 and 61 can be simultaneously run upwards to beyond the dump apex 14 with the aid of the winch cables 58 and 60. The reserve length of clearing rope required for this purpose may be provided, for example, by multiple changes of direction of the clearing rope at the guide and tension devices 62, 63 provided on both sides of the gantry. It will be appreciated that in the travel of the gantry apparatus past the dump, the scraping arm 25 (which can be used as a transverse conveyor, and which is so mounted on the gantry as to be swivellable in the vertical plane) is swung up clear of the cross-section of the dump in the manner described with reference to FIGS. 1 to 4.

Figure 7:
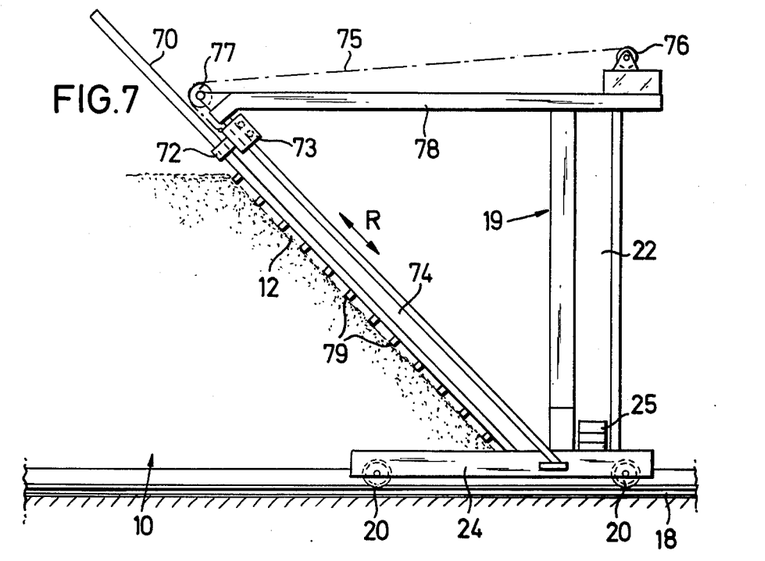
FIGS. 7 and 8 are respectively a side elevation and an end elevation (transverse to a dump) of an embodiment of an extraction apparatus in which the clearing device consists of a beam-like or rod-like clearing element.
Figure 8:
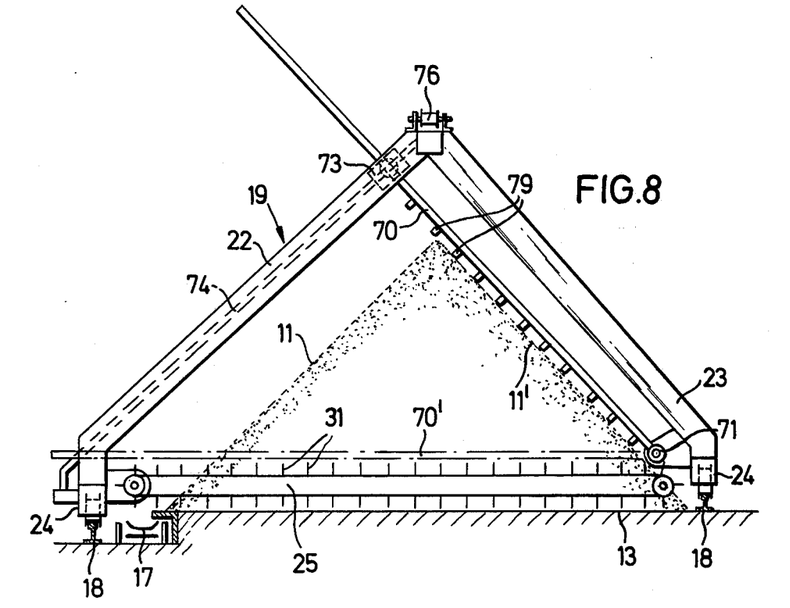

The embodiment shown in FIGS. 7 and 8 differs from the extraction apparatus shown in FIGS. 1 to 4 only in the construction of the clearing means. Here again, like parts are denoted by the same references.

The clearing means consists of a swivellable clearing rod or beam 70 of relatively high bending strength. The rod or beam 70 is pivotally mounted on a joint 71 near the foot of one gantry leg 23 and in the neighbourhood of the dump bottom 13. The axis of the joint 71 is at an inclination to the horizontal. In addition, the rod or beam 70 is arranged to slide in a sleeve 72 which is mounted on a carriage or saddle 73 so as to be rotatable about an axis extending transversely in relation to the longitudinal axis of the rod or beam 70. The carriage or saddle 73 is mounted on an inclined guide 74 extending substantially at the angle of the transverse face slope 12 of the dump 10 as shown in FIG. 7 and is movable up and down the slope in the direction of the arrow R. The cable 75 of a winch 76 mounted at the apex of the gantry engages the carriage or saddle 73. The winch cable 75 passes around a sheave 77 mounted on the end of an arm 78 connected to the travelling gantry 19 in the region of the apex and extending parallel to the direction of motion of the apparatus. When the winch cable 75 is paid out by the winch drum 76, the carriage or saddle 73 moves down the guide 74 and hence down the transverse face slope 12 under the action of gravity, whereby the rod or beam 70 carries out a swivelling movement over the slope 12 into the position 70' indicated by dash-dotted lines in FIG. 8. On the other hand, when the winch cable 75 is wound on to the cable drum, the rod or beam 70 carries out an opposite swivelling movement with the upward movement of the carriage or saddle 73. The length of the rod or beam 70 is somewhat greater than the width of the dump 10 in the region of its foot. The rod or beam 70 therefore projects upwardly beyond the gantry 19 when in the fully upwardly swivelled position (FIG. 8). In the swivelling movement, the rod or beam 70 acts on the transverse face slope 12 over its entire width, to dislodge the bulk material on the slope. The bulk material trickling down the slope is taken up in the region of the bottom 13 of the dump by the scraping arm 25 operating as a transverse conveyor, and is conveyed to the depot belt 17, as described above with reference to FIGS. 1 to 4. The rod or beam 70, which carries out a swinging movement in the manner of a windscreen wiper over the face slope 12, preferably has scraping or clearing members such as teeth 79 or the like for increasing the clearing action. Such teeth or the like may also be provided in the case of the clearing ropes described in the foregoing. It is also possible for the clearing rod or beam 70 to have a driven stripping element, e.g. a worm or an endless stripping chain.

FIG. 8 shows that the rod or beam 70 can be pivotted up so far that it is clear of the cross section of the dump. It is then possible for the extraction apparatus to run along, and off, the dump.

Figure 9:
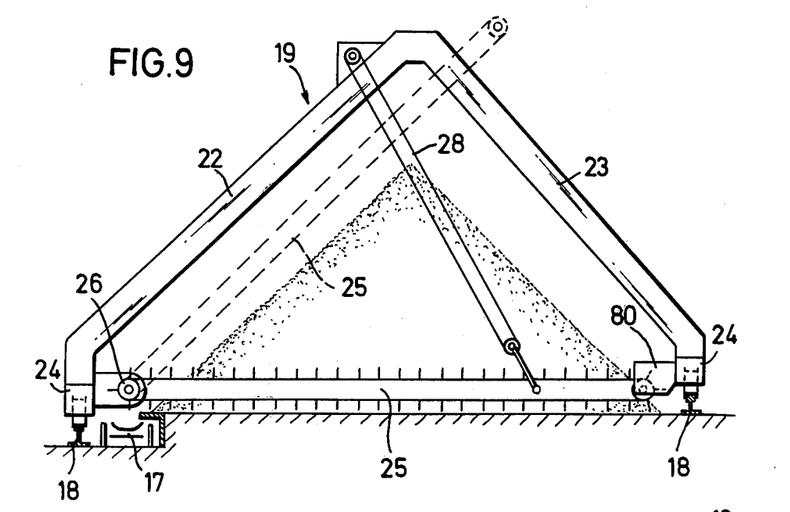
FIG. 9 is an elevational view (transversely to a dump) of an extraction apparatus having an integrally formed scraping arm, which is laterally supported in the lowered position by means of a supporting device mounted on the gantry.
Figure 10:
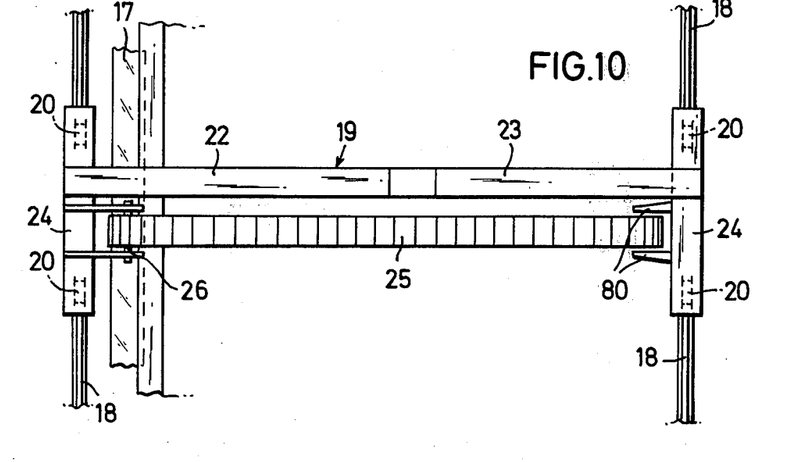
FIG. 10 is a plan view of the apparatus of FIG. 9.

FIGS. 9 and 10 shown an extraction apparatus with a one piece scraping arm similar to that described above with reference to FIGS. 1 to 4. The clearing means, which can be one of the types described above, is not shown for the sake of clarity. On the opposite side of the gantry 19 to the pivotal mounting 26 of the scraping arm 25 there is support means for the arm 25 consisting of two supporting walls 80 projecting from the head beam 24. In its lowered working position the arm 25 is supported laterally by the walls 80 at its free end remote from its pivotal mounting 26 when the apparatus is being used to remove material from the transverse face of the dump. As shown in dashed lines in FIG. 9, in its raised non-working position, the free end of the scraping arm 25 projects above the gantry. The arrangement may be such that the scraping arm 25 is laterally supported on the gantry leg 23 over its complete swivelling range. This is known per se in gantry-type scrapers. If the extraction apparatus is employed mainly for clearing the transverse face slope, it is generally sufficient for the scraping arm to be supported only in the lowermost position by the walls 80.

The extraction apparatus may also be provided with a plurality of pivotally mounted scraping arms disposed in parallel juxtaposition and/or in line with one another, as is also already known in the case of gantry-type scrapers. There is shown in FIG. 11 an extraction apparatus which is provided with two scraping arms 90 and 91 pivotable in the vertical plane. The scraping arm 90 pivots about the joint 92 and the scraping arm 91 pivots about the joint 93. The joints 92 and 93 are situated in the neighbourhood of the base 13 of the dump 10, on the opposite sides of the latter, which is here illustrated as a trapezoidal dump. The raising and lowering of the two scraping arms 90 and 91 is effected by separate winches 94 and 94', the cables 95 and 95' of which are attached to the respective scraping arms. The two scraping arms 90 and 91 are of such length that the sum of their lengths is substantially equal to the width of the dump in the region of its foot.

With the aid of the two scraping arms 90 and 91, material can be simultaneously removed from both lateral slopes 11 and 11' of the dump 10, in which case the scraping arms convey the bulk material down the respective lateral slopes and feed it to fixedly located depot belts 17, 17'. In this case, the two scraping arms operate in opposite directions, as indicated by the arrows T. Alternatively, the arrangement could be such that one scraping arm feeds the bulk material to the other scraping arm, which in turn moves it down its slope and transfers it to the depot belt 17. For example, the arrangement could be such that the scraping arm 91 moves the bulk material up the slope 11' into the working range of the opposite scraping arm 90, so that the latter can feed it to the depot belt 17. In this case, a second depot belt 17' is not necessary.

The clearing device has been omitted from the illustration in FIG. 11 for the sake of clarity. It is to be understood, however, that one of the clearing devices described in the foregoing is also provided here.

Figure 12:
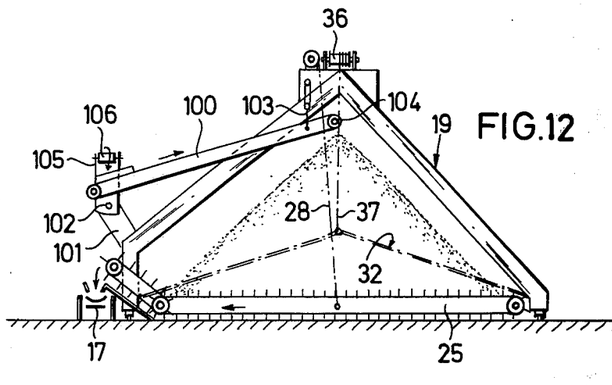
FIG. 12 is an elevational view (transverse to a dump) of a further extraction apparatus provided with means for the dumping of bulk material, in the form of a stacker.
Figure 13:
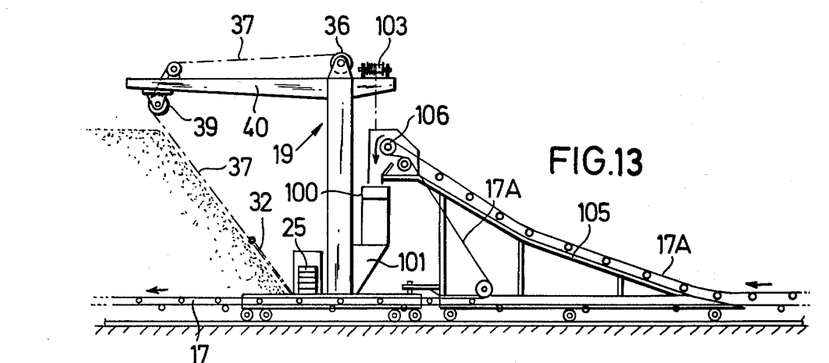
FIG. 13 is a side elevation of the apparatus according to FIG. 12.

There is illustrated in FIGS. 12 and 13 an extraction apparatus which is substantially identical in its construction and its manner of operation to that illustrated in FIGS. 1 to 4. The extraction apparatus is here further provided with stacking means for adding bulk material to the dump, the stacking means being mounted on the gantry 19 outside the working range of the clearing device. The stacking means is formed by a stacking belt 100, of which the outer end is mounted on a bracket 101 disposed on the gantry so that the belt is pivotable in the vertical plane. Its swivel bearing is denoted by 102. The stacking belt 100 is raised and lowered with the aid of a winch 103, of which the cable is attached, in the forward region, to the stacking belt, which is constructed in the form of an arm. The delivery end 104 of the stacking belt is situated centrally above the dump.

The fixedly located depot belt 17 consists in the conventional manner of a web, of which the trough-shaped run 17A extends upwards in the region of the extraction apparatus over a belt loop carriage 105 of conventional construction, which runs on rails, so that the bulk material fed by way of the belt is thrown on to the stacking belt 100 at a discharge drum 106. The bulk material is then taken up by the stacking belt 100 and deposited on the dump at the delivery end 104 of the belt. The arrangement of a stacking belt known per se together with an also-known belt loop carriage in combination with an extraction apparatus constructed in accordance with the invention makes possible for the first time that an extraction apparatus which clears a dump at its transverse face can at the same time also form its own dump. This is possible because, with this apparatus, both the clearing means and the transverse conveyor or the scraping arm can be swung clear of the cross-section of the dump, so that the apparatus can be run, during the dumping operation, over the dump which is being built up.

Various modifications of the embodiments of the invention which are described in the foregoing and illustrated in the drawings are possible. Thus, for example, there may be employed for the clearing of the dump on its face a rope clearing means such as that disclosed, for example in German Utility Model No. 6,929,752. In addition, the apparatus may be provided with a scraping arm which is hinged at a point along its length, known as a hinged arm, so that the pivotally connected parts of the arm can be swivelled in the vertical plane in relation to one another. Such apparatus are also known per se. In the extraction apparatus according to the invention, the gantry is preferably constructed as a full gantry, although a half-gantry of known construction could also be provided. It is to be understood that the clearing means consisting of a clearing rod, beam or the like, such as those illustrated by way of example in FIGS. 7 and 8, may readily also be constructed so that these clearing means can carry out clearing work as double clearing means operable in both directions of travel, as described with reference to FIGS. 5 and 6, in the case of a clearing rope. In this case, one clearing beam, rod or the like may be provided for each direction of operation of the extraction apparatus. In the case of the clearing ropes described in the foregoing, the sheave 39, 52, 53 provided on the arm 40, 50, 51 may be so mounted that it can be moved or slid in the longitudinal direction of the arm in order that the operating section of the clearing rope may be adapted to different angles of inclination of the face slopes 12. The same may be achieved in the case of the clearing means according to FIGS. 7 and 8 by adjustment of the angle of inclination of the carriage guide 74. In the illustrated embodiments, the rope tension weights have been shown on the outside of the gantry for the sake of clarity. These devices may alternatively be constructed as slides or carriages which run on the inclined gantry legs or in the interior of hollow gantry legs. The feet of the clearing rope should be situated as low as possible in the neighbourhood of the foot of the slope. In the drawings they have been shown somewhat higher for the sake of clarity.

Having thus described our invention, we claim:

1. Apparatus for extracting bulk material from a dump having a length, a foot defining the transverse width of said dump, a top defining the height of said dump, and an inclined transverse face extending between said top and said foot, and inclined lateral slopes along said length forming the sides of said dump, said apparatus comprising:

a pair of base portions disposed on either side of said foot moveable in a direction of travel parallel to the length of said dump, a gantry extending from said bases and spanning said dump above said top and said lateral slopes, a transverse scraper chain conveyor including an arm pivotally mounted on said gantry and having a first working position adjacent said foot and a second working position above said lateral slopes and, driven clearing means movably arranged on said gantry and having an operating position wherein said clearing means is adapted to work on and to move over substantially the entirety of said transverse face in contact therewith so as to dislodge bulk material from said transverse face, said driven clearing means being moveable out of its operating position to an inoperative position above and clear from said lateral sides and said top of said dump, whereby when said clearing means is in said operating position and said scraper chain conveyor is in said first position said scraper chain conveyor removes material from said dump which is dislodged by said clearing means, and further, whereby when said clearing means is in said inoperative position and said scraper chain conveyor is in said second working position, said gantry may be moved along the length of said dump in said direction without interference from said clearing means and said conveyor means.

2. Extraction apparatus according to claim 1, wherein the free end portion of the arm bears laterally against the gantry.

3. Extraction apparatus according to claim 1, wherein on that side of the gantry opposite to the pivotal mounting of the arm thereto, means are provided to support the arm laterally when it is in its first said working position at the bottom of the transverse face of the dump.

4. Extraction apparatus according to claim 1, wherein the ends of the transverse scraper chain conveyor are carried by a rigid arm extending therebetween the length of the conveyor being at least substantially equal to the transverse width of the dump at its foot.

5. Extraction apparatus according to claim 1, wherein a plurality of transverse scraper chain conveyors are provided with arms pivotally mounted on the gantry substantially in parallel juxtaposition and one behind the other in longitudinal series.

6. Extraction apparatus according to claim 1, having two scraper chain conveyors each having an arm pivotally mounted adjacent one of the two feet of the gantry for movement in a vertical plane transverse to the said longitudinal direction, the sum of the lengths of these conveyors being at least substantially equal to the transverse width of the dump at its foot.

7. Extraction apparatus according to claim 1, wherein the transverse scraper chain conveyor is carried by an arm having two hingedly connected parts.

8. Extraction apparatus according to claim 1, having an arm for supporting the clearing means extending from the gantry in the said direction of travel and above the top of the dump.

9. Extraction apparatus according to claim 1, wherein the clearing means has a range of working positions and is reciprocable over the entire transverse face of the dump by means of a reciprocating drive, by means of which it can also be moved to a non-working position clear of said dump.

10. Extraction apparatus according to claim 9, wherein the clearing means is a flexible clearing element having a variable length, means being provided for accommodating the variation in the length moving over the transverse face of the dump during reciprocation.

11. Extraction apparatus according to claim 10 wherein the flexible clearing element is a clearing rope.

12. Extraction apparatus according to claim 10 having swivelling points for the flexible clearing element adjacent the feet of the two opposite sides of the gantry so as to be in the neighborhood of the foot of the dump, the reciprocating drive engaging the flexible clearing element between the two said swivelling points, at least one of which being a direction changing member for the flexible clearing element and over which extra length is brought in from a reserve or surplus length returned thereto to keep the flexible clearing element taut.

13. Extraction apparatus according to claim 10 having an arm for supporting the clearing means extending from the gantry in the said direction of travel and above the apex of the dump, the reciprocating drive being provided by a reciprocating winch with a cable therefrom to the flexible clearing element running over the said arm.

14. Extraction apparatus according to claim 9 wherein the clearing means is at least one rod-form clearing element.

15. Extraction apparatus according to claim 14 wherein one end of the rod-form clearing element is pivotally mounted on the apparatus adjacent the foot of the dump, while it is slidingly supported at a distance from the pivotal mounting in a member, which in turn is constructed and adapted to be raised and lowered on an inclined guide by means of the reciprocating drive.

16. Extraction apparatus according to claim 15 wherein the said member consists of a sleeve which is rotatably mounted on a saddle which is upwardly and downwardly movable on the inclined guide.

17. Extraction apparatus according to claim 9 wherein the clearing means is provided with teeth.

18. Extraction apparatus according to claim 9 wherein the clearing means is provided with driven cutting means.

19. Extraction apparatus according to claim 1 having clearing means at either side of the apparatus, in the said direction of travel, forming double clearing means operable either forwardly or in reverse with respect to the said direction of travel.

20. Extraction apparatus according to claim 19 wherein the double clearing means consists of an endless clearing rope, the direction of which is changed a number of times in the region of one side of the base of the dump to provide a bight of rope as a reserve, by means of direction-changing members forming swivelling points, the rope sections constituting the clearing means at each side of the apparatus being acted on by respective reciprocating drives.

21. Extraction apparatus according to claim 1 also having stacking means for dumping bulk material onto the dump, the said stacking means being disposed on the apparatus outside the working position of the clearing means.

22. Extraction apparatus according to claim 21 wherein the stack means includes a stacking belt mounted on the apparatus in such manner as to be swivellable in the vertical plane.

* * * * *